(12) United States Patent
Kalverkamp

(10) Patent No.: US 8,827,070 B2
(45) Date of Patent: Sep. 9, 2014

(54) CONVEYING DEVICE FOR ROOT CROP HARVESTERS

(75) Inventor: Klemens Kalverkamp, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 539 days.

(21) Appl. No.: 13/213,347

(22) Filed: Aug. 19, 2011

(65) Prior Publication Data

US 2012/0043263 A1 Feb. 23, 2012

(30) Foreign Application Priority Data

Aug. 20, 2010 (DE) .......................... 10 2010 035 043

(51) Int. Cl.
*B65G 15/42* (2006.01)
*A01D 17/10* (2006.01)
*B65G 15/52* (2006.01)

(52) U.S. Cl.
CPC ................ *B65G 15/52* (2013.01); *A01D 17/10* (2013.01); *A01D 2017/108* (2013.01); *A01D 2017/103* (2013.01)
USPC .......................... 198/690.2; 198/716; 198/822

(58) Field of Classification Search
CPC ......... B65G 15/42; B65G 15/44; B65G 47/58
USPC ......... 198/690.02, 698, 699.1, 716, 801, 820, 198/822, 844.2
See application file for complete search history.

(56) References Cited

U.S. PATENT DOCUMENTS

| | | | | |
|---|---|---|---|---|
| 336,126 A | * | 2/1886 | Ludlum ...................... | 198/690.2 |
| 4,019,625 A | * | 4/1977 | Wiese ........................... | 198/708 |
| 5,000,312 A | * | 3/1991 | Damkjaer ...................... | 198/853 |
| 6,332,531 B1 | * | 12/2001 | Damkjaer .................. | 198/690.2 |
| 6,467,610 B1 | * | 10/2002 | MacLachlan ............. | 198/699.1 |
| 6,554,129 B2 | * | 4/2003 | Straight et al. ............. | 198/699.1 |
| 6,758,329 B1 | * | 7/2004 | Damkjær et al. ............. | 198/853 |
| 6,811,021 B1 | * | 11/2004 | Corley ......................... | 198/690.2 |
| 7,182,202 B2 | * | 2/2007 | Kalverkamp .............. | 198/844.1 |
| 7,597,189 B2 | * | 10/2009 | Hinsley et al. ............. | 198/690.2 |
| 7,686,159 B2 | * | 3/2010 | Elsner ............................ | 198/853 |
| 2008/0135383 A1 | * | 6/2008 | Elsner ............................ | 198/853 |

FOREIGN PATENT DOCUMENTS

| | | |
|---|---|---|
| DE | 201 16 382 U1 | 3/2003 |
| DE | 20 2005 008 426 U1 | 10/2005 |
| EP | 1 200 062 B1 | 4/2004 |
| EP | 1 728 739 B1 | 7/2008 |

* cited by examiner

*Primary Examiner* — Gene Crawford
*Assistant Examiner* — Keith R Campbell
(74) *Attorney, Agent, or Firm* — Gudrun E. Huckett

(57) ABSTRACT

A conveying device for a root crop harvester has an endless conveying member combined of monolithic structural elements connected sequentially to each other in a belt shape. The structural elements each have an entrainment member and a support surface supporting objects to be transported on the endless conveying member. The structural elements each have at least one connecting zone. The structural elements in the connected position each form a flat element connected sequentially at the connecting zone, respectively. In the connected position of the structural elements, the entrainment members extend transversely to a conveying direction of the endless conveying member and between the transversely extending entrainment members the support surfaces are positioned, respectively.

26 Claims, 9 Drawing Sheets

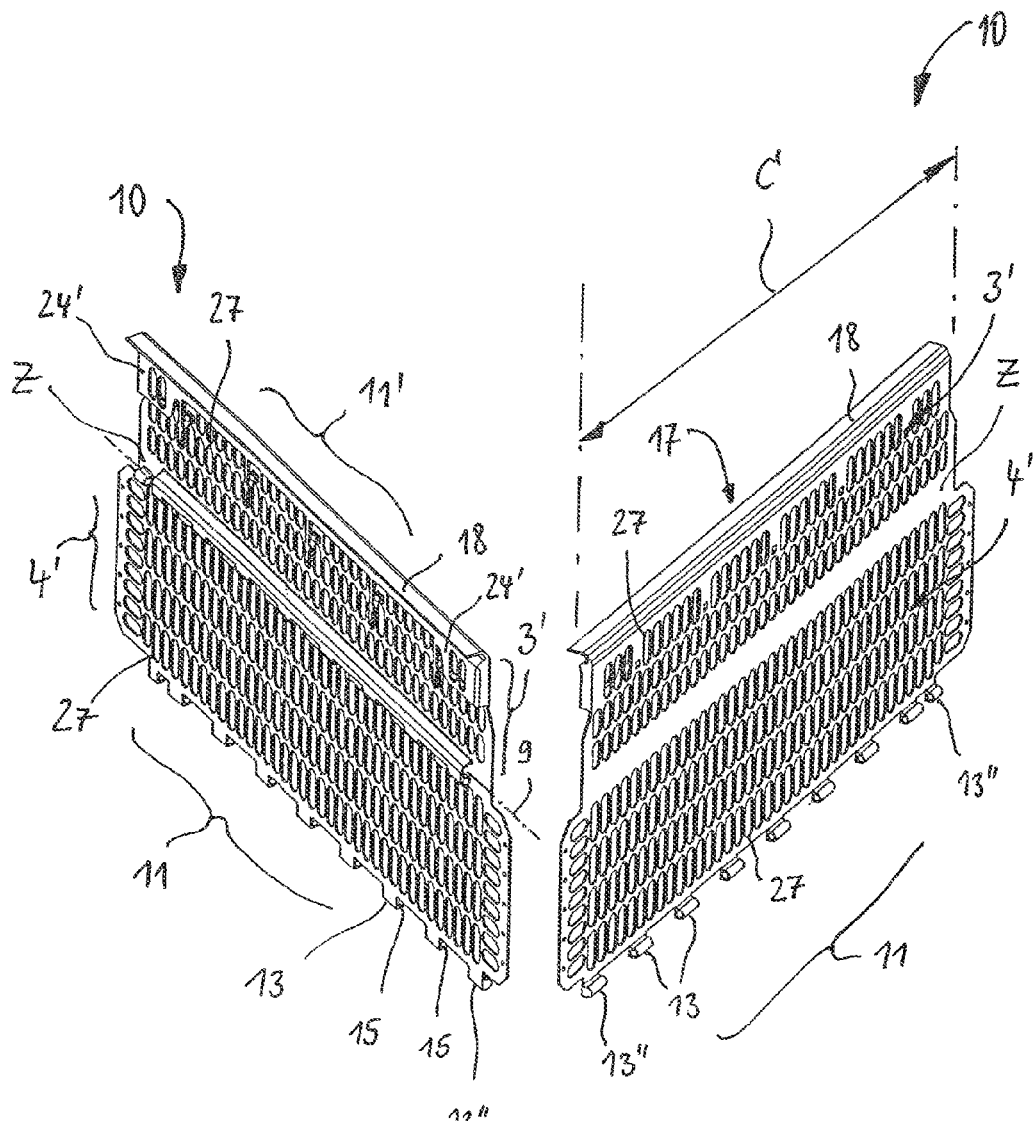

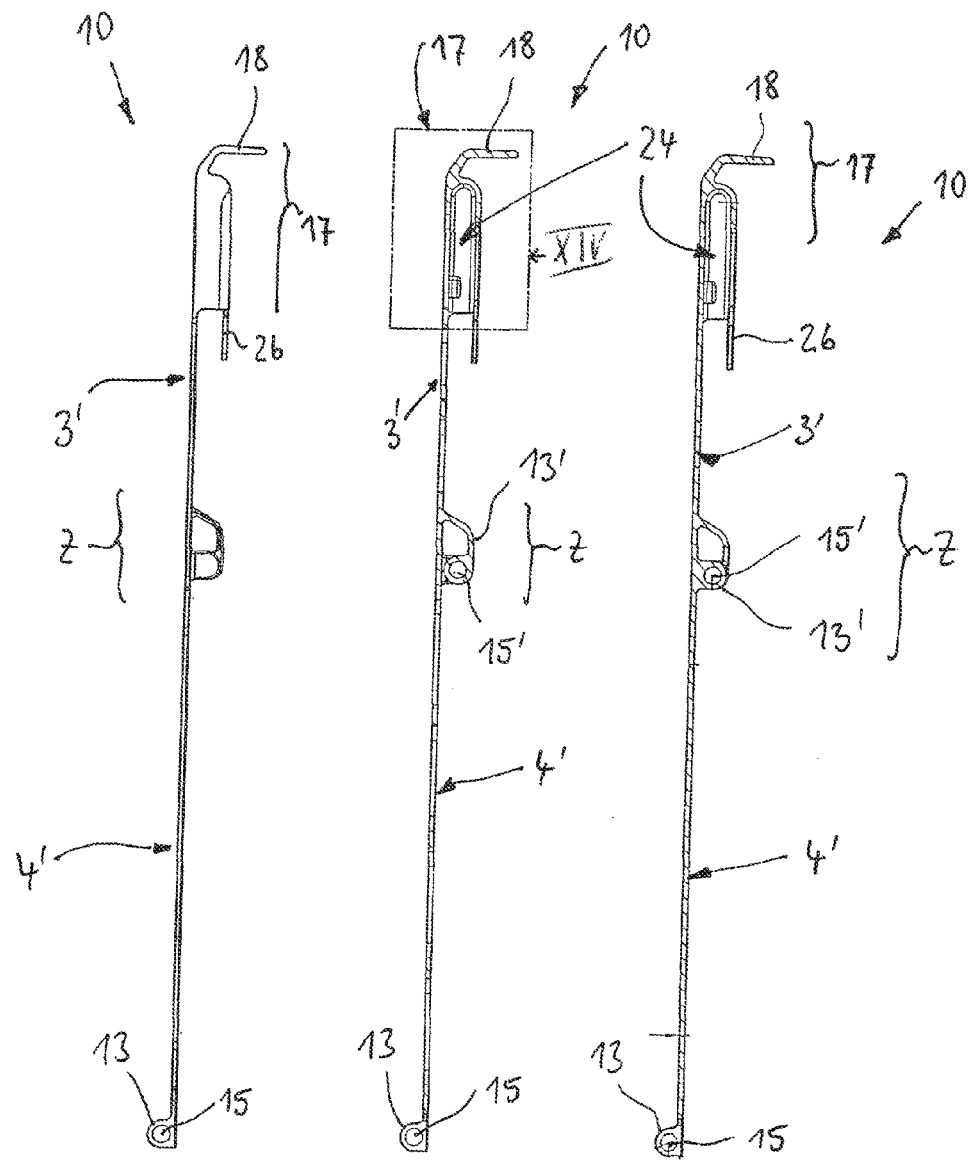

CONVEYING DEVICE FOR ROOT CROP HARVESTERS

BACKGROUND OF THE INVENTION

The invention relates to a conveying device for root crop harvesters with an endless circulating conveying member that is separated by entrainment members that extend transversely to the conveying direction into several support surfaces for potatoes, beets or similar objects to be conveyed.

Known conveying devices for root crop harvesters, sorting devices or similar applications in harvesting technology comprise rod chain conveyors that act like conveyor belts and are used in particular for potato and root crop harvesters, wherein during transport thereon soil particles that have been taken up together with the harvested goods are removed by screening action. Moreover, conveying devices are known (DE 201 16 382 U1, EP 1 728 739 B1) that, as transfer elevators, transfer the harvested goods to transport vehicles or the like. In these devices, belt-shaped, grid-shaped or fabric-like support surfaces for the substantially cleaned harvested goods are effective, wherein the harvested objects are retained by entrainment members extending transversely to the conveying direction in the area of the support surfaces and are safely conveyed even in areas of slanted conveying stretches.

The invention has the object to provide a conveying device for, in particular, root crop harvesters wherein the conveying device has a conveying member that can be produced and assembled with minimal expenditure and has an improved long-term stability (service life) while ensuring a gentle transfer of the harvested goods and enabling with comparatively minimal weight of the system an adaptation to different conveying lengths.

SUMMARY OF THE INVENTION

The invention solves this problem by a configuration of the conveying device for root crop harvesters that is characterized in that the conveying member is provided with several monolithic (one-piece) structural elements, each defining at least one entrainment member as well as at least one support surface, wherein these structural elements each have at least one connecting zone and can be connected to each other at the at least one connecting zone, respectively, in the form of flat elements to form a belt-shaped configuration.

With respect to further advantageous embodiments, reference is being had to the dependent claims.

The conveying device for root crop harvesters or similar fields of application is provided with a conveying member that, embodied in accordance with the present invention, is comprised of individual flat elements. They are produced in the form of monolithic (one-piece) structural elements such that each of the flat elements defines as integral partial areas at least one entrainment member and at least one support surface.

For forming a conveying member that with respect to its length is substantially variable, these structural elements are strung together to a belt shape and connected to each in a row so that, beginning with a substantially planar initial position of the flat structural element, the partial area of the entrainment member can assume an angled position relative to the immediately adjacent support surface and in this way in the conveying direction a plurality of a generally known sequentially arranged "conveying pockets" are formed. With the belt-shaped sequential arrangement, respective connecting zones for the "endless" conveying member are predetermined wherein these connecting zones are of an articulated configuration (hinge-like configuration) and the respective connecting axes extend transversely to the conveying direction.

For forming an endless belt-shaped conveying member it is also conceivable to connect in a pull-resistant way the individual structural elements in respective connecting zones that extend parallel to the conveying direction or to combine transversely and longitudinally oriented connecting zones.

These structural elements, together with the entrainment members and support surfaces provided as partial areas, are formed at least partially of plastic material so that conveying phases with gentle treatment of the harvested goods as they are achievable in a comparative conveying device with conveying fabric (DE 20 2005 008 426) are possible also. At the same time, as a result of the monolithic (one-piece) plastic configuration of the structural elements, an advantageous increase of the service life or long-term stability of such systems is achieved also because an appropriate tear strength is effective.

By optimizing the manufacturing process, the structural elements can be manufactured in particular as injection molded parts in high numbers and inexpensively so that structural elements, sequentially arranged to a belt shape in connected position, form a system comprised of identical parts that can be easily mounted and, with appropriate selection of the plastic material as well as of the material thickness, is of a lightweight configuration. Injection molding requires appropriate tools (molds) that are designed cost-efficiently with respect to the manufacture of flat elements as individual parts. These substantially "planar" flat elements with the partial areas of the entrainment member and of the support surface can also be designed such that the respective entrainment members are formed at the flat element as partial areas that project perpendicularly from its flat surface and, in the assembly phase, the free ends of the support surfaces are thus connected in abutting arrangement, respectively.

The constructive configuration of the structural elements in the area of the entrainment member and/or of the support surface provides that in these partial areas through openings are formed such that, while providing excellent elastic properties, the long-term stability or service life of the conveying belt comprised of the structural elements remains substantially unaffected. By configuration of an appropriate hole pattern in the structural elements the conveying device can additionally be used for a screening phase that follows the actual harvesting process because, for example, the supplied root crop as harvested goods in the area of the support surface carries out another "rolling movement" and therefore adhering soil parts can be removed from the root crop. In this way, soil or sand components that have been transferred onto the conveying member as an undesirable admixture can drop through the hole pattern; the soil/sand is not transported farther on the conveying member so that the harvested goods that is finally reaching the transportation means has a reduced amount of soil.

The monolithic structural elements have in the surface area between entrainment member and support surface a bending zone, respectively, that extends in the connected position transversely to the conveying direction. In this area that is also useable as a connecting zone, the articulated "angular adjustment", embodied similar to a film hinge, of the entrainment member relative to the respective support surface is realized such that, in the conveying direction of the endless circulating conveying member, in the area of these entrainment members optimal receiving and entrainment conditions for the portions of the harvested goods contained in the pocket-like compartments defined between the entrainment members are provided.

For the comparatively simple assembly of the structural elements that in the connected position are strung together or arranged sequentially in a row to form a belt-shaped structure, it is provided that the structural elements are provided in the connecting zones with connecting profiles, respectively. In this connection, the structural elements are designed such that connecting profiles that interact with each other are provided in particular in the area of the bending zone. The connecting profiles of the bending zone are formed to be complementary to the connecting profiles that are provided at leading ends of the transverse sides of the support surfaces, respectively. These complementary connecting profiles in the simplest case can be provided with respective locking and/or clip-on elements so that a quick connection of this tongue-and-groove structure is conceivable.

In an expedient embodiment, in the area of these connecting profiles an additional transverse support member is provided. It can engage in the form-fitting connected position simultaneously the two connecting profiles engaging each other so that in this way structural elements adjacent to each other have a pull-resistant fixation. The respective transverse support members can pass through partial areas of the connecting profiles formed as projections and are secured at the edges in blind bores or similar receiving pockets, respectively. Also, it is conceivable that the transverse support members are connected to lateral drive belts of the conveying device.

The structural elements formed of plastic material are provided at the topside that is receiving the harvested goods with a material layer that ensures minimal adhesion of soil and plant parts so that the structural elements that, while having optimal elasticity, have a minimal weight are protected at the surface from disadvantageous adhesion of undesirable admixed parts of the harvested goods so that in this way a weight increase during the harvesting process even in case of heavy soil is avoided.

It is understood that the afore described construction of the conveying member of monolithic structural elements provides a simple assembly and exchangeability within the system, wherein the system in accordance with the selected material can be embodied to be elastic and tear-resistant.

This conveying device with the monolithic structural elements is provided in particular in the form of a transfer elevator on an extractor- or lifter-type harvester. The transfer elevator is arranged as an attachment on a potato harvester or root crop harvester such that the harvested goods discharged by the harvester is received and moved in an especially gentle way. In this connection, the advantages of providing the structural elements made of plastic material in the conveying member are also noticeable in that on these structural elements contact profiles are provided, respectively, that are contacting the harvested goods and, in accordance with the transport direction, are optimally matched to the conveying concept. In this connection it is provided in particular that the entrainment member is provided with a protective lip extending across the entire length of the transverse edge area and, in this way, a gentle gliding across of the harvested goods without sharp-edged contact points is enabled.

The construction of the structural element is optimized in this connection such that the transverse support or a stabilizer that can be integrated into the structural elements can absorb the respective pulling and/or pressure forces on the conveying belt and with a covering means for the stabilization parts at the same time also a gentle treatment of the harvested goods is ensured.

A further embodiment provides that the structural elements are formed as monolithic flat elements with several of the entrainment members and support surfaces. This is in particular conceivable by manufacture in special injection molding devices wherein preferably a "double-variant" with two entrainment members and two support surfaces is provided and in this connection a "monolithic" bending zone as a connecting area is interposed.

The concept of the structural elements comprised of plastic material also provides that they are to be provided immediately, for example, during manufacture by injection molding, with lateral limiters that adjoin at least the area of the support surface so that an additional assembly of components on the conveying device is not needed. Also, it is conceivable that the lateral limiters are securable by form-fit and/or force-lock or friction-lock connectors or a fused connection or adhesive connection at the edges of the support surfaces.

Further details and advantageous effects of the conveying device result from the following description and the drawing in which embodiments of the invention is illustrated in detail.

BRIEF DESCRIPTION OF THE DRAWING

FIG. 7 is a perspective illustration of the structural element according to FIG. 5.

FIG. 8 is another perspective illustration of the structural element according to FIG. 5.

FIG. 9 is a side view of the structural element according to FIG. 5.

FIG. 10 is a section illustration of the structural element according to section line X-X of FIG. 5.

FIG. 11 is a section illustration of the structural element according to the section line XI-XI of FIG. 5.

DESCRIPTION OF THE PREFERRED EMBODIMENTS

Figure 1:
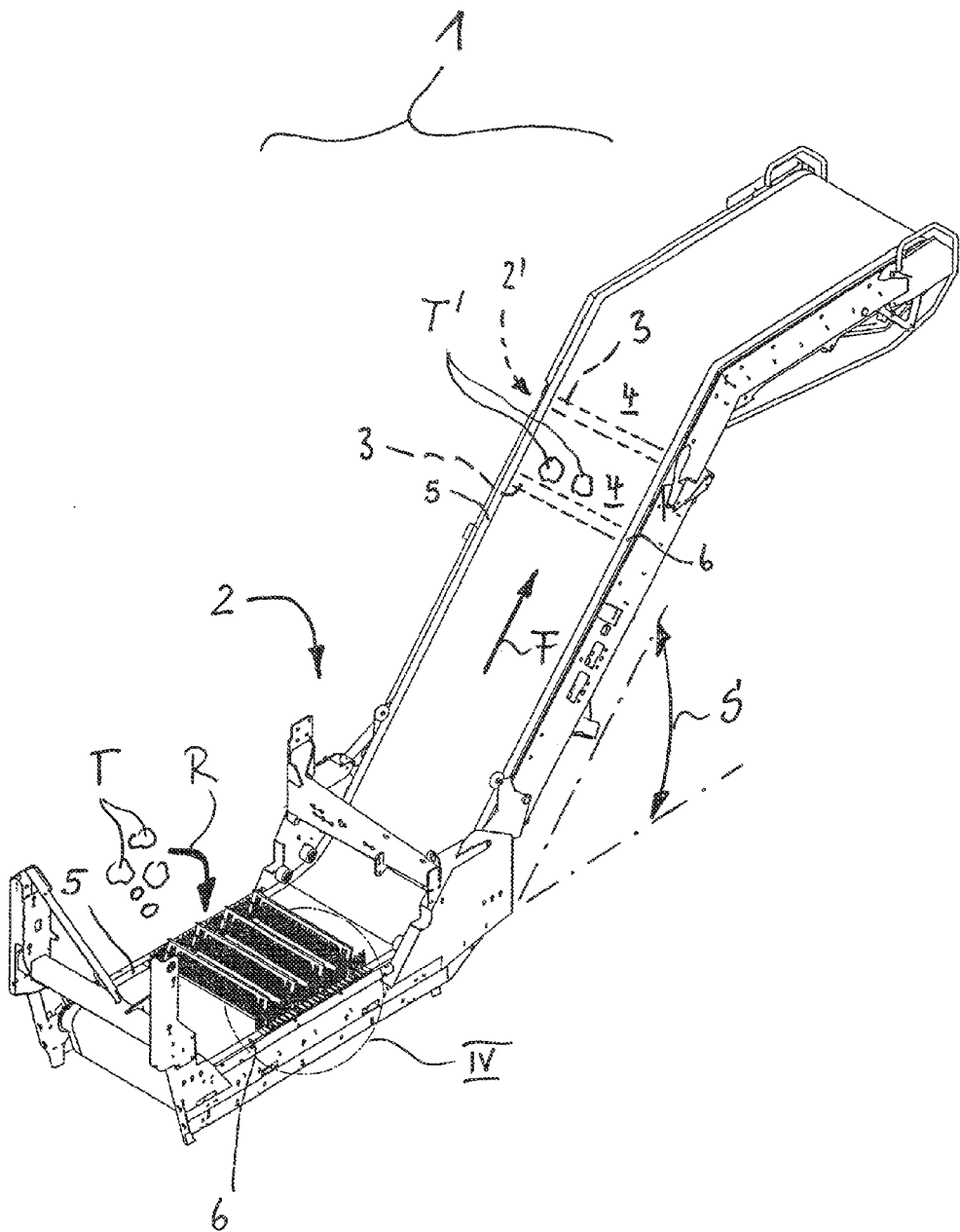
FIG. 1 is a perspective overview illustration of a conveying device designed as a transfer elevator for a root crop harvester.

The conveying device 1 in FIG. 1 is in particular in the form of a transfer elevator for a root crop harvester (not illustrated).

Figure 4:
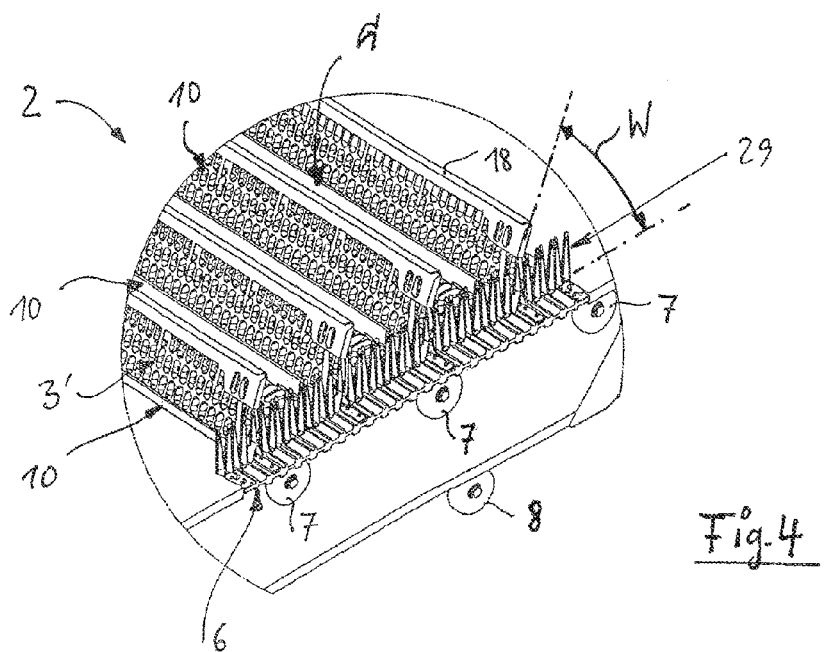
FIG. 4 is a detail view in the area of the structural element according to detail IV of FIG. 1.

Such conveying devices (DE 20 2005 008 426) have an endless circulating conveying member 2' that is provided with several support surfaces 4 for receiving essentially potatoes, beets, and similar crop or goods T to be conveyed and supplied in supply direction (arrow R). The support surfaces 4 are separated from each other by transversely extending entrainment members 3 extending transversely to the conveying direction F (illustration of prior art in FIG. 1 to the right). Such conveying members 2' are driven by two parallel extending drive belts 5, 6 (FIG. 2) or the like and interacted with respective drive and deflection rollers 7, 8 (FIG. 4).

Figure 2:
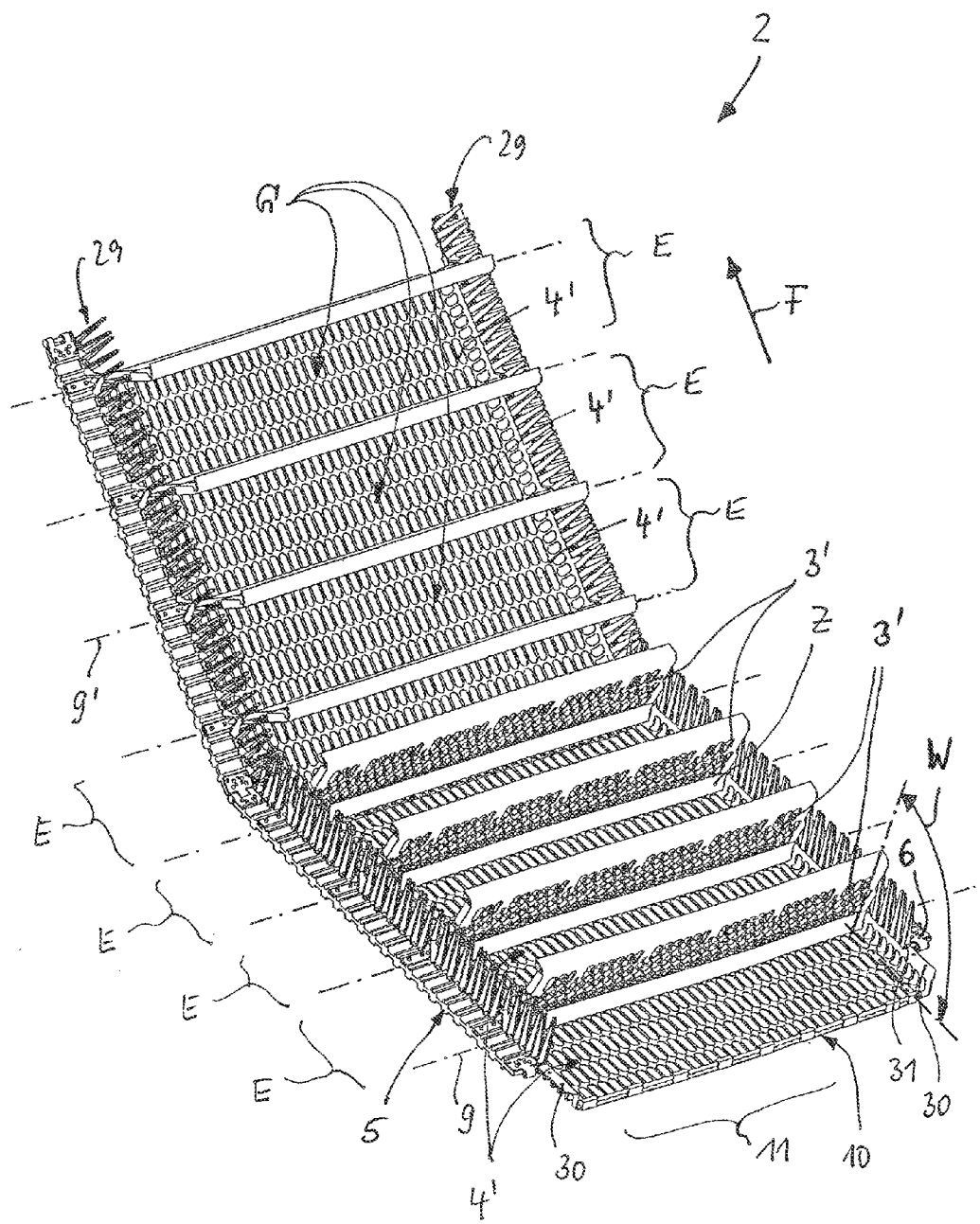
FIG. 2 is a perspective detail view of a partial area of an endless circulating conveying member with flat elements according to the invention in the form of structural elements that are abutting each other.

The conveying device 1 has a constructively improved conveying member 2 that in the embodiment according to the invention (detail IV of FIG. 1; see FIG. 4) is comprised of several flat elements E comprising as two functionally integrated partial areas the entrainment member 3' as well as the support surface 4' (FIG. 2). These flat elements E are in the form of monolithic structural elements 10 (FIG. 5) that, as shown in the illustrations of FIG. 1 through FIG. 4, adjoin each other "belt-like" (in a belt shape) in the illustrated connected position in such a way that by means of the resulting endless conveying member 2 in the conveying device 1 an appropriate conveying action of the harvested goods T, T' from the supply location to the discharge location is possible (in the direction indicated by arrow F).

Figure 5:
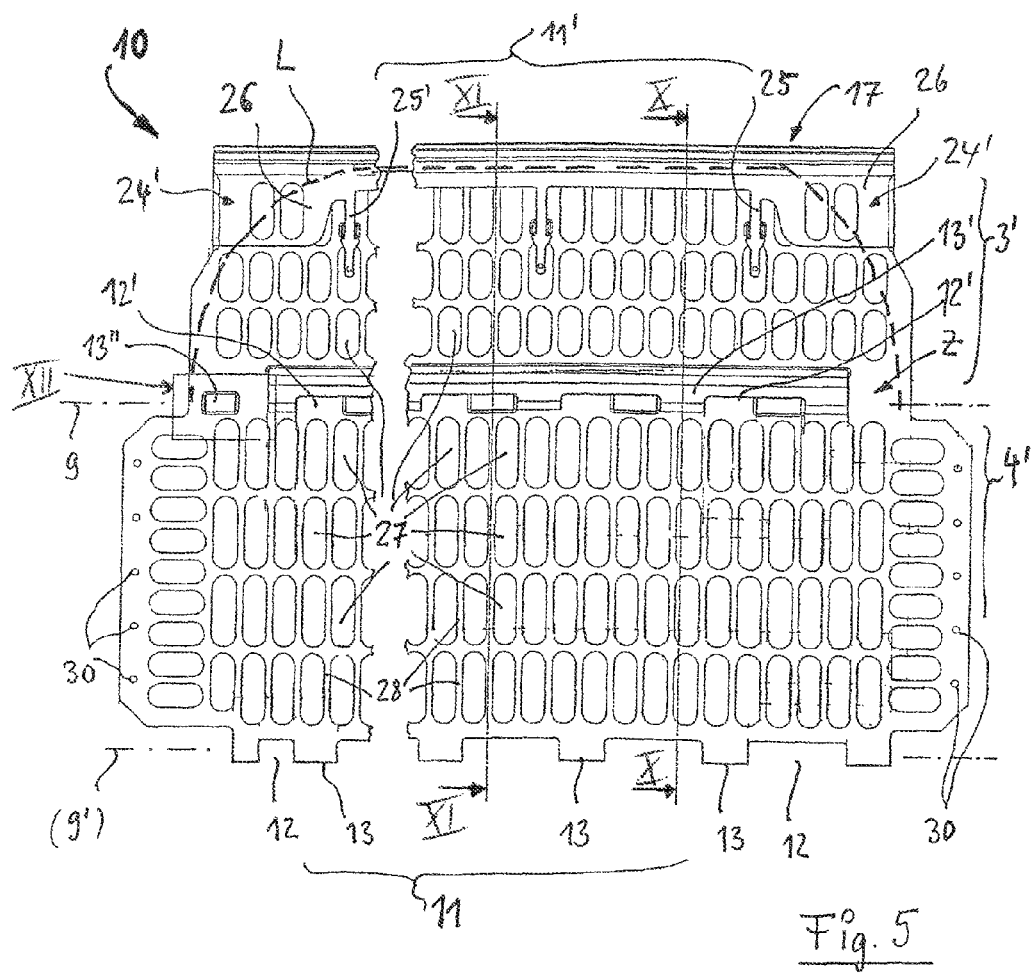
FIG. 5 is a plan view of the structural element according to the invention produced as a monolithic flat element.
Figure 15:
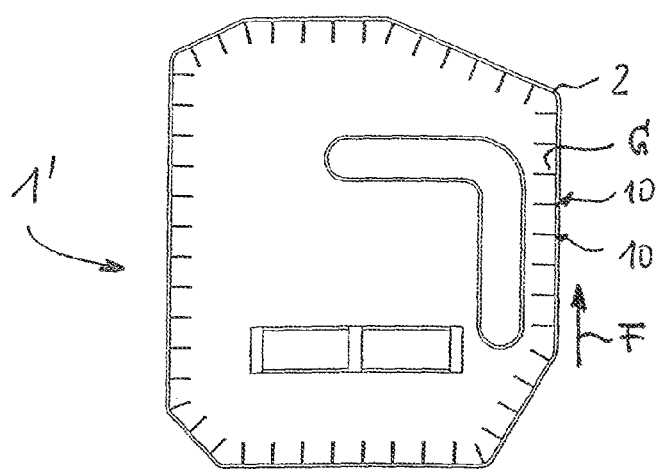
FIG. 15 is a schematic illustration of a conveying device in a first mounted position of the conveying member.
Figure 16:
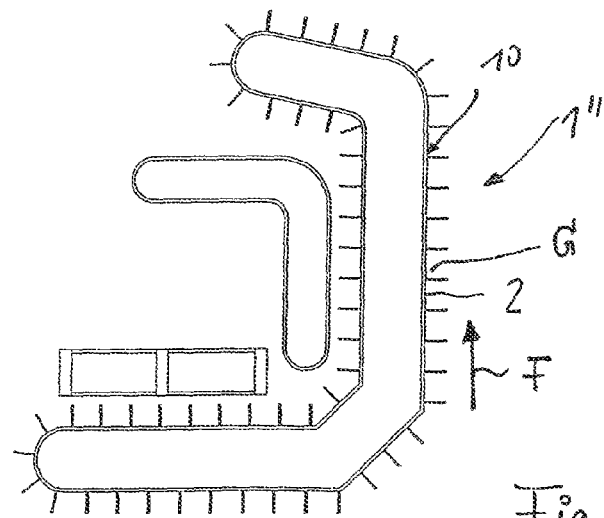
FIG. 16 is a schematic illustration of the conveying device in a second mounted position of the conveying member.
Figure 17:
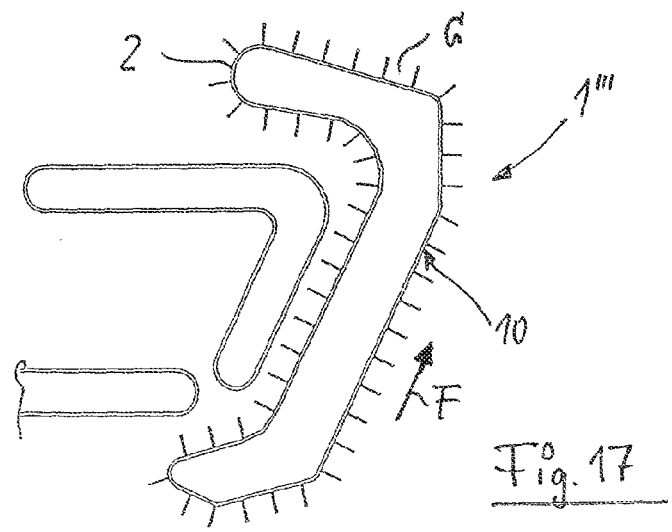
FIG. 17 is a schematic illustration of the conveying device in a third mounted position of the conveying member.

When looking at FIGS. 1 and 5, it is apparent that the structural elements 10, produced as a flat element E, respectively, and connected to each other at connecting zones Z in a pull-resistant way, interact with each other in an articulated fashion in the mounted position such that the contours of the transport paths of the conveying member 2 as illustrated in FIGS. 15 to 17 can be optimally traversed.

By means of these structural elements 10 substantially length-variable conveying members 2 for conveying devices 1 can be combined wherein the one-part (monolithic) concept of the structural elements 10 provides for optimal adaptation of the partial areas 3' and 4' effective during the conveying action to the requirements of the harvested goods T. In addition to an optimization with respect to assembly and exchangeability within this system, the structural elements 10 can be manufactured of plastic material with functional integration such that an optimal post-screening behavior on roots, beets or similar harvested goods T is effective, wherein gentle entrainment of the harvested goods is ensured and, as a result of minimal adhesion of soil parts on the plastic material of the structural elements 10, the long-term stability of the system as a whole is increased. In accordance with the provided conditions of use, the monolithic structural elements 10 can be produced in an optimal manufacturing process as injection-molded parts; by variable selection of the material as well as the wall thickness a minimal weight can be achieved. The weight can be further reduced with appropriate configuration of through openings 27 (FIG. 5). The structural elements 10 as a whole can be produced to be elastic and tear-resistant at the same time.

When looking at the individual illustrations of the structural elements 10 according to FIG. 5 showing the mounted connected position with several of these flat elements E according to FIG. 2, it is apparent that the monolithic structural elements 10 in the area between their support surfaces 4' and the flat entrainment member 3' are provided with a bending zone Z that extends substantially in transverse direction across the entire width C (FIG. 8) of the structural element 10.

In the connected position of the structural elements 10 (FIG. 2 through FIG. 4) where the sequentially arranged and connected structural elements 10 form a belt structure, the respective flat partial areas of the entrainment members 3' are displaced into a respective angled position W (FIG. 2) relative to the plane of the respective support surface 4'. These angled positions W of the entrainment members 3' may be substantially variably predetermined. In the illustrated position of use of the conveying member 2, the respective bending zones Z of the structural elements 10 are acting like a film hinge or a similar articulated connection such that the entrainment members 3' in different conveying phases or slanted conveying positions (FIG. 1, FIG. 2) in conveying direction F have an optimal position, respectively, for transporting the harvested goods T, T' and in this connection the two connected partial areas 3', 4', in particular when the conveying slant S changes, are "pivotable" about a transverse axis 9, 9' such that comparatively minimal wear loads occur at the structural elements 10. The construction provides in this connection that the entrainment member 3' moved into its angled position W is secured in this position such that this position at least in the ascending conveying phase (FIG. 1, arrow F) even at different conveying devices 1' (FIG. 15), 1" (FIG. 16), and 1''' (FIG. 17) ensures optimal transport.

For an optimal serial connection of the structural elements 10 in the connected position, it is provided that the trailing transverse sides 11 (FIG. 2, FIG. 3) of the support surfaces 4' in the conveying direction F are connected with the adjoining structural elements 10 in the area of the respective bending zone Z so that in this way pocket-like entrainment zones G (FIG. 2) for the harvested goods T are formed. At the same time, the respective contact surfaces 4' adjoin each other and by means of the angled position W of the entrainment members 3' the entrainment zones (compartments) G are separated from each other For producing these connections the structural element 10 (FIG. 5) in the area of its bending zone Z and of the transverse side 11 is provided with substantially complementary connecting profiles that may be in the form of locking or clip-on elements (not illustrated). In the illustrated embodiment of the structural elements 10 (FIG. 5 to FIG. 8), groove-like free spaces 12, 12' and projections 13, 13' of a tongue shape insertable into the free spaces 12, 12' are provided as complimentary connecting profiles in the area of the transverse side 11 and the bending zone Z.

Figure 12:
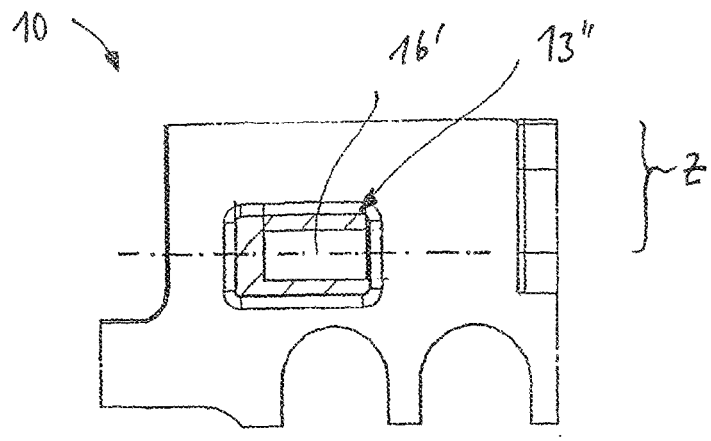
FIG. 12 is a detail illustration according to detail XII of FIG. 5.

In an expedient embodiment, the structural elements 10 to be connected in the area of the complementary connecting profiles may interact with an additional transverse support member 14 (FIG. 3) so that the connecting stability in the connected position is increased. In this connection, the structural element 10 in the area of the projections 13, 13' forming the connecting profile has one or several through openings 15, 15' extending in transverse direction (section illustration according to FIG. 10 and FIG. 11) so that therein the rod-shaped transverse support 14 can be received. In the area of the projections 13" (FIG. 6, FIG. 13) that are positioned in transverse direction at the edge a fixation of the transverse support 14 is possible in that the structural element 10 is provided with a blind bore 16, 16' (FIG. 12, FIG. 13) that is closed at the bottom side. Also, it is conceivable that the transverse support 14 is extended into the area of the drive belts 5, 6 and is connected thereto. Also, a connection with the stabilizer 20 (FIG. 3) may be provided.

Figure 14:
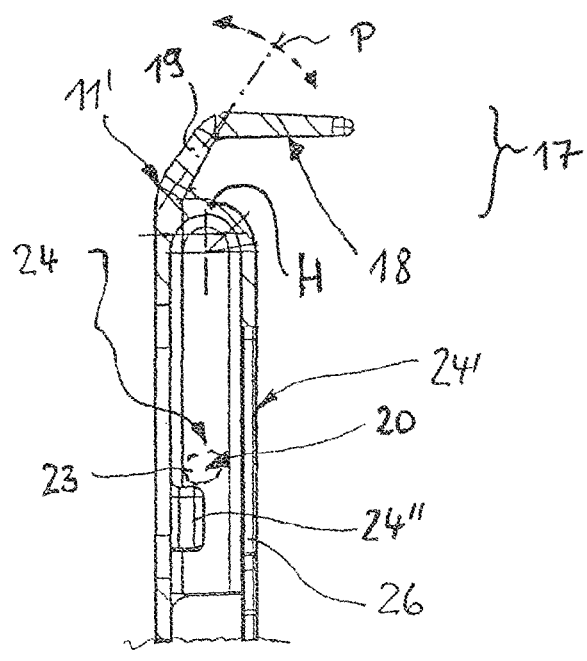
FIG. 14 is a detail illustration according to detail XIV of FIG. 10.

When looking at FIG. 7 and FIG. 8 in conjunction with FIG. 14, it becomes apparent that the entrainment member 3' of the structural element 10 is provided with a contact profile 17 at the transverse edge area 11' that, in the connected position, is forming the top end in the position of use according to FIG. 2. The contact profile 17 effects a gentle displacement or movement of harvested goods T. The section illustration according to FIG. 14 illustrates that the contact profile 17 is formed as a monolithic component together with the transverse edge area 11' of the entrainment member 3 and that, at least partially, a projecting lip 18 is formed (FIG. 9 to FIG. 11). This lip 18 projecting past it. This lip 18 extends across the entire length of the transverse edge area 11' or the width of the structural element 10 (FIG. 8). It is also conceivable that the lip 18 has in longitudinal direction separated sections (not illustrated).

For a further optimization of this profile area at the edge area 11' of the entrainment member 3, the lip 18 is provided with an angled and conically tapering profile area 19 so that a particular gentle deflection of the harvested goods T in the supply phase (arrow R, FIG. 1) as well as in the transfer situation is achieved. The lip 18 can be displaced in a "springy" fashion, can yield or be deflected according to the respective weight load in the respective pivoting directions P (FIG. 14), and can dampen the impacts of the harvested goods T in this way.

Figure 6:
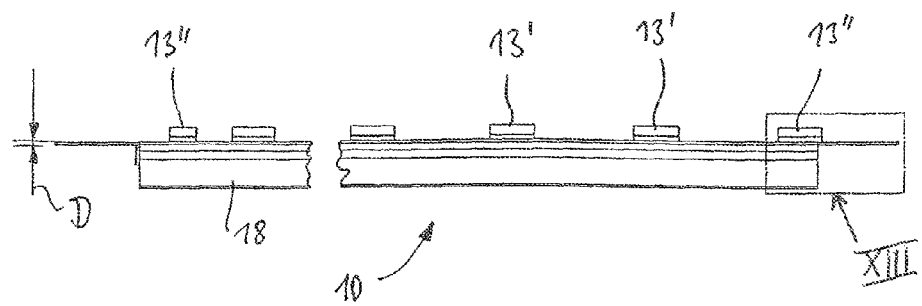
FIG. 6 is a front view of the structural element according to FIG. 5.
Figure 13:
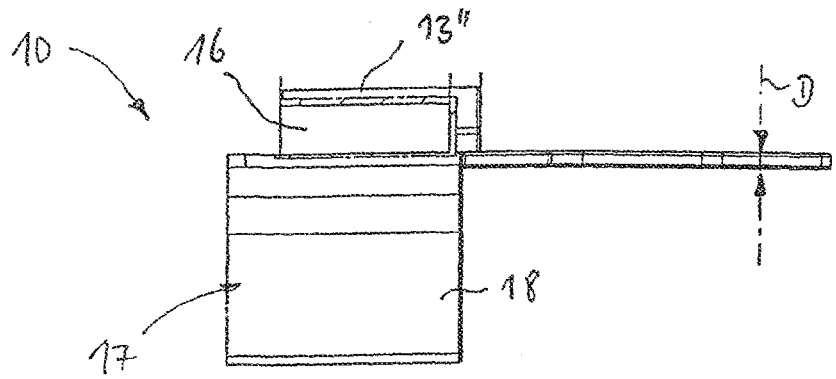
FIG. 13 is a detail illustration according to detail XIII of FIG. 6.

With respect to weight-optimized production of the structural element 10 it is proposed to produce it with minimal wall thickness D (FIG. 6, FIG. 13). In this way, the flat elements E by means of a "fabric-like" design are substantially unstable so that in the illustrated mounted position and connected position several of the structural elements 10 at least over areas thereof may require reinforcement of the entrainment members 3' or the support surfaces 4'. For this purpose it is provided that the structural element 10 at least in the partial area of the entrainment member 3' is provided with a stabilizer 20 (FIG. 3) that can be integrated in the entrainment member 3'.

Figure 3:
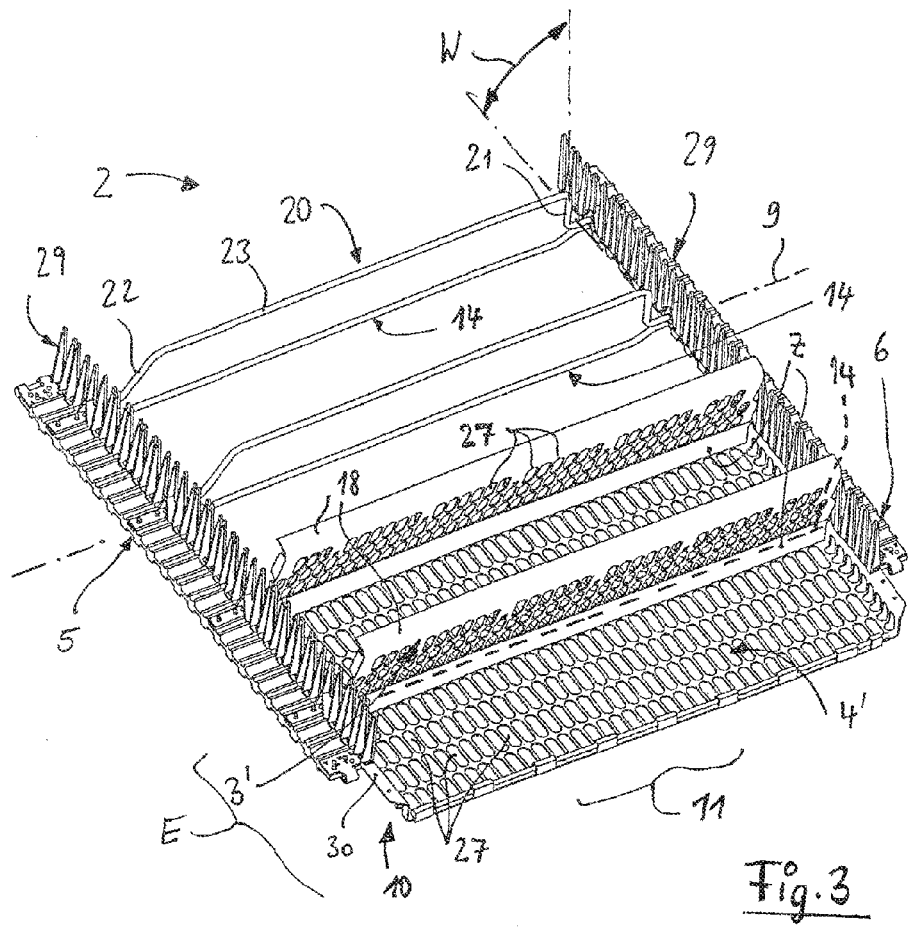
FIG. 3 is a detail illustration in a view similar to FIG. 2 with details of the embodiment of the conveying member in accordance with the invention.

This basic illustration according to FIG. 3 makes clear that the stabilizer 20 is designed as a support bracket with lateral legs 21, 22 and a central bar 23; the support bracket can be manufactured of metal and/or plastic material. In an expedient embodiment the stabilizer 20, and also the transverse support 14 that forms the transverse axis 9, each can be made of fiberglass-reinforced plastic material so that an optimal elasticity in the area of the receiving pockets G that are loaded by the weight of the harvested goods T is achieved.

For receiving the stabilizer 20 that, beginning at the bending zone Z, extends arcuate (dashed line L in FIG. 5), the structural element 10 is at least partially provided with profiled pockets 24, respectively (FIGS. 9 to 11, FIG. 14) that are active as covering profiles and that prevent an immediate contact of the harvested goods T with the stabilizer 20. The latter can be secured in the profiled pockets 24 by means of a profiled projection 24".

The view according to FIG. 5 shows that the two lateral covering profiles 24' are formed as cover flaps 26 each provided with clip-on holders 25, 25'. The flaps 26 in the upper area of the transverse edge 11 near the connecting point of the lip 18 have a "flexible" holding zone H (FIG. 14).

The already described function of the structural element 10 with a "post-screening phase" acting on the harvested goods T is achieved in that respective through openings 27 on both partial areas 3' and 4' are provided. In this connection, the through openings 27 are embodied as a hole pattern that optimizes the weight per surface area of the structural element 10. The hole pattern is configured such that across the entire flat element E minimal web areas 28 are achieved (FIG. 5). In this way, while optimal transport properties across the entire transport stretch of the device 1 or of the conveying stretch of the conveying member 2 are provided, also a discharge of undesired admixtures on the harvested goods T is achieved.

The complete concept of the conveying device 1 (FIG. 1) provides that the structural element 10 at least in the area of its respective support surface 4' is provided with generally known lateral limiters 29. The illustrations according to FIGS. 2 to 4 show that the lateral limiters 29 by means of connecting openings 30 and connecting means 31 can be secured in the area of the structural element 10 or the drive belts 5, 6. Likewise, it is conceivable that the lateral limiters 29 in the manufacture of the structural element 10, for example, in an injection molding process, can be integrally formed thereon or the lateral limiters can be attached by weld connection or an adhesive connection (not illustrated).

In FIG. 15 to FIG. 17 basic illustrations of conveying devices 1',1", and 1'" with different conveying stretches and lengths are illustrated in which the conveying member 2 embodied according to the invention with schematically illustrated structural elements 10 is used. FIG. 15 shows an annular elevator 1'. FIG. 16 shows a lateral elevator 1". FIG. 17 shows the configuration of a steep elevator V'".

Figure 18:
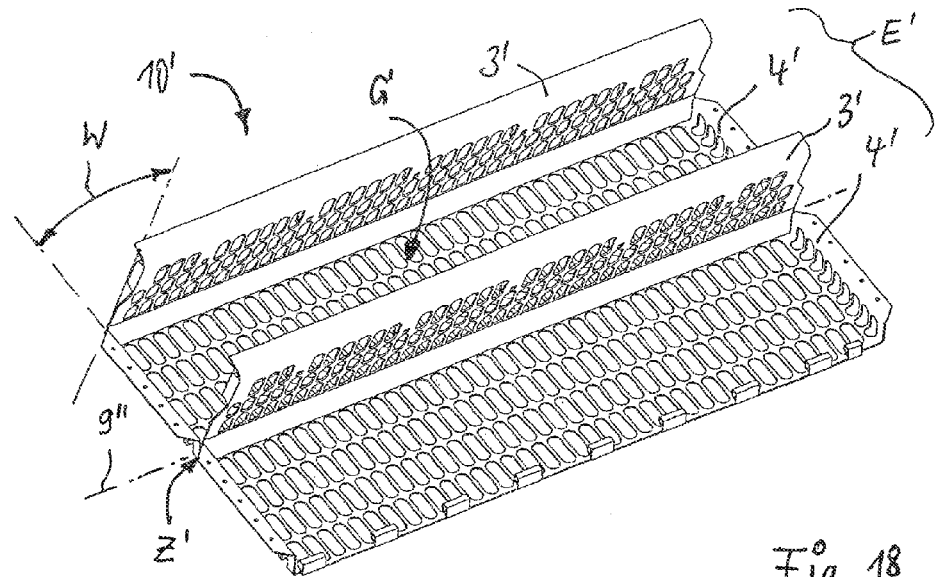
FIG. 18 is a perspective illustration of a second embodiment of the monolithic structural element with two entrainment members and two support surfaces.
Figure 19:
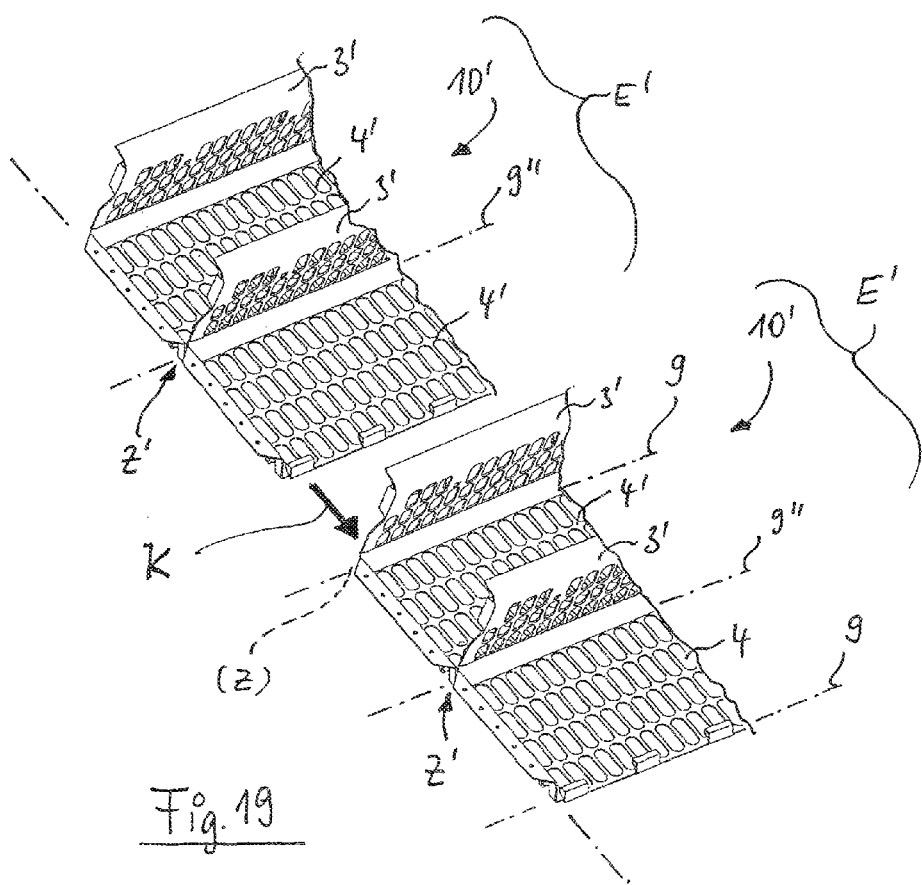
FIG. 19 is a schematic illustration of a connecting phase during assembly of the structural elements according to FIG. 18.

FIGS. 18 and 19 show a second embodiment of the structural elements 10' embodied as monolithic flat elements E' each provided with two entrainment members 3' as well as two support surfaces 4'. These units are each provided with a bending and connecting zone Z' which is produced prior to belt assembly as a connection that is integrated in the unit by manufacturing technology so that at the same time the "hinge function" in the area of the transverse axis 9" acting in the same way as the axis 9 is achieved. Therefore, this construction that is produced in particular as an injection-molded part has a "double-variant" of active surfaces. Also further similar designs of larger structural elements, for example, with three or more integrally formed partial surfaces are conceivable (not illustrated).

FIG. 19 discloses an assembly phase upon connecting the two larger structural elements 10' wherein in an insertion phase (arrow K) "additionally" the connecting profiles disclosed in connection with FIGS. 1 through 8 are effective. For this embodiment, the individual features of the structural element 10' that are disclosed in connection with FIG. 5 are not again explained here.

In this assembly variant of the structural element 10 a belt-shaped sequential arrangement is realized with two differently configured and substantially same-acting flexible bending zones Z and Z'. It is understood that the described embodiments of the two structural elements 10 and/or 10' can be joined to a belt (FIG. 1) in substantially variable sequences and such a belt is used in conveying devices 1 provided with the respective advantages, even for different belt dimensions.

The specification incorporates by reference the entire disclosure of German priority document 10 2010 035 043.5 having a filing date of Aug. 20, 2010.

While specific embodiments of the invention have been shown and described in detail to illustrate the inventive principles, it will be understood that the invention may be embodied otherwise without departing from such principles.

What is claimed is:

1. A conveying device for a root crop harvester, the conveying device comprising:
an endless conveying member comprising monolithic structural elements connected in a connected position sequentially to each other in a belt shape;
wherein the structural elements each have an entrainment member and a support surface supporting objects to be transported on the endless conveying member;
wherein the structural elements each have at least one connecting zone;
wherein the structural elements, in a connected position, each form a flat element connected sequentially at the connecting zone, respectively;
wherein, in the connected position of the structural elements, the entrainment members extend transversely to a conveying direction of the endless conveying member and between the transversely extending entrainment members the support surfaces are positioned, respectively;

wherein the structural elements each are provided in the area between the support surface and the entrainment member with a transversely extending bending zone;

wherein in each of the structural elements the entrainment member is pivotable relative to the support surface of the structural member about a transverse axis that extends transversely to the conveying direction of the endless conveying member such that an angled position of the entrainment member relative to a plane of the support surface is provided.

2. The conveying device according to claim 1, wherein the structural elements each are comprised at least partially of plastic material in the area of the entrainment member and the support surface and wherein the at least one connecting zone is of an articulated configuration.

3. The conveying device according to claim 1, wherein the structural elements are injection-molded identical parts and the endless conveying member comprised of the structural elements constitutes a modular lightweight system.

4. The conveying device according to claim 1, wherein the bending zone is acting as a film hinge so that the angled position of the entrainment member is variable, wherein the entrainment member is securable in the angled position after reaching the angled position.

5. The conveying device according to claim 1, wherein the bending zone has a first connecting profile and the transverse side has a second connecting profile that is complementary to the first connecting profile of the bending zone.

6. The conveying device according to claim 1, wherein the entrainment member of the structural elements has a transverse edge area that is provided with a contact profile that effects of gentle displacement of harvested goods.

7. The conveying device according to claim 6, wherein the contact profile is formed monolithically with the transverse edge area and has a lip that projects at least partial past the entrainment member.

8. The conveying device according to claim 7, wherein the lip extends across the entire length of the transverse edge area.

9. The conveying device according to claim 6, wherein the lip has an angled profile area that in a position of use of the entrainment member covers the transverse edge area.

10. The conveying device according to claim 1, wherein the structural elements each comprise a stabilizer that is integrated at least in the area of the entrainment member.

11. The conveying device according to claim 10, wherein the structural elements each have covering profiles with profiled pockets, wherein the stabilizers extend upwardly away from the bending zone and are secured in the profiled pockets.

12. The conveying device according to claim 1, wherein the structural elements have through openings provided in at least one of the entrainment member and the support surface, wherein the through openings provide a screening function.

13. The conveying device according to claim 12, wherein the through openings are provided in a hole pattern with webs, wherein the hole pattern is configured to optimize a weight per surface area of the structural element.

14. The conveying device according to claim 1, wherein the structural element is provided at least in the area of the support surface with lateral limiters.

15. The conveying device according to claim 14, wherein the lateral limiters are formed monolithically with the structural element.

16. The conveying device according to claim 14, wherein the lateral limiters are secured on the support surface by form-fit; by force locking action; or by form-fit and force-locking action.

17. A conveying device for a root crop harvester, the conveying device comprising:

an endless conveying member comprising monolithic structural elements connected in a connected position sequentially to each other in a belt shape;

wherein the structural elements each have an entrainment member and a support surface supporting objects to be transported on the endless conveying member;

wherein the structural elements each have at least one connecting zone;

wherein the structural elements, in a connected position, each form a flat element connected sequentially at the connecting zone, respectively;

wherein, in the connected position of the structural elements, the entrainment members extend transversely to a conveying direction of the endless conveying member and between the transversely extending entrainment members the support surfaces are positioned, respectively;

wherein the structural elements each are provided in the area between the support surface and the entrainment member with a transversely extending bending zone;

wherein, in the connected position of the structural elements, a transverse side of the support surface of a first one of the structural elements is connected to the bending zone of a second one of the structural elements adjoining the first structural element, wherein the support surfaces of the first and second structural elements adjoin each other and the entrainment member of the second structural element is moved into an upright position at the bending zone separating the support surfaces of the first and second structural elements from each other.

18. A conveying device for a root crop harvester, the conveying device comprising:

an endless conveying member comprising monolithic structural elements connected in a connected position sequentially to each other in a belt shape;

wherein the structural elements each have an entrainment member and a support surface supporting objects to be transported on the endless conveying member;

wherein the structural elements each have at least one connecting zone;

wherein the structural elements, in a connected position, each form a flat element connected sequentially at the connecting zone, respectively;

wherein, in the connected position of the structural elements, the entrainment members extend transversely to a conveying direction of the endless conveying member and between the transversely extending entrainment members the support surfaces are positioned, respectively;

wherein the structural elements each are provided in the area between the support surface and the entrainment member with a transversely extending bending zone;

wherein the bending zone has a first connecting profile and the transverse side has a second connecting profile that is complementary to the first connecting profile of the bending zone;

wherein the structural elements each comprise a transverse support member in the area of the first and second connecting profiles.

19. The conveying device according to claim 18, wherein the first and second connecting profiles are provided with locking elements; clip-on elements; or locking elements and clip-on elements.

20. The conveying device according to claim 18, wherein the first and second connecting profiles comprise free spaces and tongue-shaped projections insertable into the free spaces.

21. The conveying device according to claim 20, wherein the structural element in the area of the tongue-shaped projections has one or several through openings to receive one or several of the transverse support member in the form of a rod.

22. The conveying device according to claim 20, wherein at least in the area of the tongue-shaped projections at least one blind bore is provided.

23. A conveying device for a root crop harvester, the conveying device comprising:
- an endless conveying member comprising monolithic structural elements connected in a connected position sequentially to each other in a belt shape;
- wherein the structural elements each have an entrainment member and a support surface supporting objects to be transported on the endless conveying member;
- wherein the structural elements each have at least one connecting zone;
- wherein the structural elements, in a connected position, each form a flat element connected sequentially at the connecting zone, respectively;
- wherein, in the connected position of the structural elements, the entrainment members extend transversely to a conveying direction of the endless conveying member and between the transversely extending entrainment members the support surfaces are positioned, respectively;
- wherein the structural elements each are provided in the area between the support surface and the entrainment member with a transversely extending bending zone;
- wherein the structural elements each comprise a stabilizer that is integrated at least in the area of the entrainment member;
- wherein the stabilizer is a support bracket comprised of lateral legs and a central bar connecting the lateral legs, wherein the support bracket is made of metal; plastic material; or metal and plastic material.

24. A conveying device for a root crop harvester, the conveying device comprising:
- an endless conveying member comprising monolithic structural elements connected in a connected position sequentially to each other in a belt shape;
- wherein the structural elements each have an entrainment member and a support surface supporting objects to be transported on the endless conveying member;
- wherein the structural elements each have at least one connecting zone;
- wherein the structural elements, in a connected position, each form a flat element connected sequentially at the connecting zone, respectively;
- wherein, in the connected position of the structural elements, the entrainment members extend transversely to a conveying direction of the endless conveying member and between the transversely extending entrainment members the support surfaces are positioned, respectively;
- wherein the structural elements each are provided in the area between the support surface and the entrainment member with a transversely extending bending zone;
- wherein the structural elements each comprise a stabilizer that is integrated at least in the area of the entrainment member;
- wherein the structural elements each have covering profiles with profiled pockets, wherein the stabilizers extend upwardly away from the bending zone and are secured in the profiled pockets;
- wherein the structural elements in the area of the covering profiles are provided with cover flaps provided with clip-on holders.

25. A conveying device for a root crop harvester, the conveying device comprising:
- an endless conveying member comprising monolithic structural elements connected in a connected position sequentially to each other in a belt shape;
- wherein the structural elements each have an entrainment member and a support surface supporting objects to be transported on the endless conveying member;
- wherein the structural elements each have at least one connecting zone;
- wherein the structural elements, in a connected position, each form a flat element connected sequentially at the connecting zone, respectively;
- wherein, in the connected position of the structural elements, the entrainment members extend transversely to a conveying direction of the endless conveying member and between the transversely extending entrainment members the support surfaces are positioned, respectively;
- wherein the structural is provided with several of said entrainment member and several of said support surface.

26. The conveying device according to claim 25, wherein the endless conveyor member comprises said structural elements in different configurations with one or several of the entrainment members and one or several of the support surfaces connected to each other in a variable sequence.

* * * * *